(12) United States Patent
Rachels et al.

(10) Patent No.: US 12,355,608 B2
(45) Date of Patent: Jul. 8, 2025

(54) NOTIFICATION SERVICE IMPLEMENTATION

(71) Applicant: Microsoft Technology Licensing, LLC, Redmond, WA (US)

(72) Inventors: Justin W. Rachels, Sammamish, WA (US); Yoram Atir, Kirkland, WA (US); Yitzhak Kesselman, Bellevue, WA (US)

(73) Assignee: Microsoft Technology Licensing, LLC

( * ) Notice: Subject to any disclaimer, the term of this patent is extended or adjusted under 35 U.S.C. 154(b) by 443 days.

(21) Appl. No.: 16/898,107

(22) Filed: Jun. 10, 2020

(65) Prior Publication Data

US 2021/0392032 A1 Dec. 16, 2021

(51) Int. Cl.
*H04L 41/0604* (2022.01)
*H04L 41/0631* (2022.01)
*H04L 41/0677* (2022.01)
*H04L 41/0686* (2022.01)

(52) U.S. Cl.
CPC ...... *H04L 41/0627* (2013.01); *H04L 41/0631* (2013.01); *H04L 41/0677* (2013.01); *H04L 41/0686* (2013.01)

(58) Field of Classification Search
CPC ............. H04L 41/0627; H04L 41/0631; H04L 41/0677; H04L 41/0686
See application file for complete search history.

(56) References Cited

U.S. PATENT DOCUMENTS

| | | | |
|---|---|---|---|
| 7,454,372 B1* | 11/2008 | Anaya | G06Q 40/00 705/35 |
| 10,985,970 B1* | 4/2021 | Goyal | G06F 16/2477 |
| 2014/0081925 A1* | 3/2014 | Haeberle | G06F 16/174 707/E17.009 |
| 2016/0224405 A1* | 8/2016 | Bohn | G06F 11/0793 |
| 2017/0168884 A1* | 6/2017 | Bray | G06F 11/0709 |
| 2018/0123815 A1* | 5/2018 | Milvaney | H04L 12/1827 |
| 2018/0145871 A1* | 5/2018 | Golin | H04W 68/06 |
| 2018/0150683 A1* | 5/2018 | Gordon | G06V 20/52 |
| 2019/0228361 A1* | 7/2019 | Prime | G06Q 10/06315 |
| 2020/0372367 A1* | 11/2020 | Ha | G06N 3/088 |
| 2021/0135971 A1* | 5/2021 | Martin | H04L 41/145 |

* cited by examiner

*Primary Examiner* — William G Trost, IV
*Assistant Examiner* — Abdelbasst Talioua

(57) ABSTRACT

In some examples, notification service implementation may include detecting, with respect to a notification service of a plurality of notification services, based on an analysis of signals received at an activity event hub, at least one incident associated with activities of an entity. Based on an analysis of the incident, a determination may be made as to whether the incident is actionable, and information related to the incident may be requested from a data endpoint. Based on the received information, a notification object may be generated to notify the entity of the incident. Further information related to the incident may be stored with respect to the notification service by utilizing a database that is commonly used by the plurality of notification services. A stateless restart associated with the notification service may be performed in an event of a failure of the notification service based on the stored further information.

20 Claims, 13 Drawing Sheets

1000

DETECT, WITH RESPECT TO A NOTIFICATION SERVICE OF A PLURALITY OF NOTIFICATION SERVICES THAT ARE EACH GEOGRAPHICALLY LOCATED AT DIFFERENT GEOGRAPHIC LOCATIONS, BASED ON AN ANALYSIS OF SIGNALS RECEIVED AT AN ACTIVITY EVENT HUB ASSOCIATED WITH THE NOTIFICATION SERVICE, AT LEAST ONE INCIDENT ASSOCIATED WITH ACTIVITIES OF AN ENTITY
1002

DETERMINE, BASED ON AN ANALYSIS OF THE AT LEAST ONE DETECTED INCIDENT, WHETHER THE AT LEAST ONE DETECTED INCIDENT IS ACTIONABLE
1004

BASED ON A DETERMINATION THAT THE AT LEAST ONE DETECTED INCIDENT IS ACTIONABLE, REQUEST INFORMATION RELATED TO THE AT LEAST ONE DETECTED INCIDENT
1006

RECEIVE, BASED ON THE REQUEST, THE INFORMATION RELATED TO THE AT LEAST ONE DETECTED INCIDENT
1008

GENERATE, BASED ON THE RECEIVED INFORMATION RELATED TO THE AT LEAST ONE DETECTED INCIDENT, A NOTIFICATION OBJECT TO NOTIFY THE ENTITY OF THE AT LEAST ONE DETECTED INCIDENT
1010

*FIG. 10*

NOTIFICATION SERVICE IMPLEMENTATION

BACKGROUND

In some cases, an entity, such as an organization, an enterprise, or another such entity, may generate operational data related to various operations performed with respect to day-to-day activities of the entity. The operational data may be analyzed to identify any incidents that may be of concern to the entity. Once an incident is identified, the entity may perform remediation steps to address the incident.

BRIEF DESCRIPTION OF DRAWINGS

Features of the present disclosure are illustrated by way of example and not limited in the following figure(s), in which like numerals indicate like elements, in which:

FIG. 10 illustrates a flowchart of an example method for notification service implementation in accordance with an embodiment of the present disclosure.

DETAILED DESCRIPTION

Figure 1:
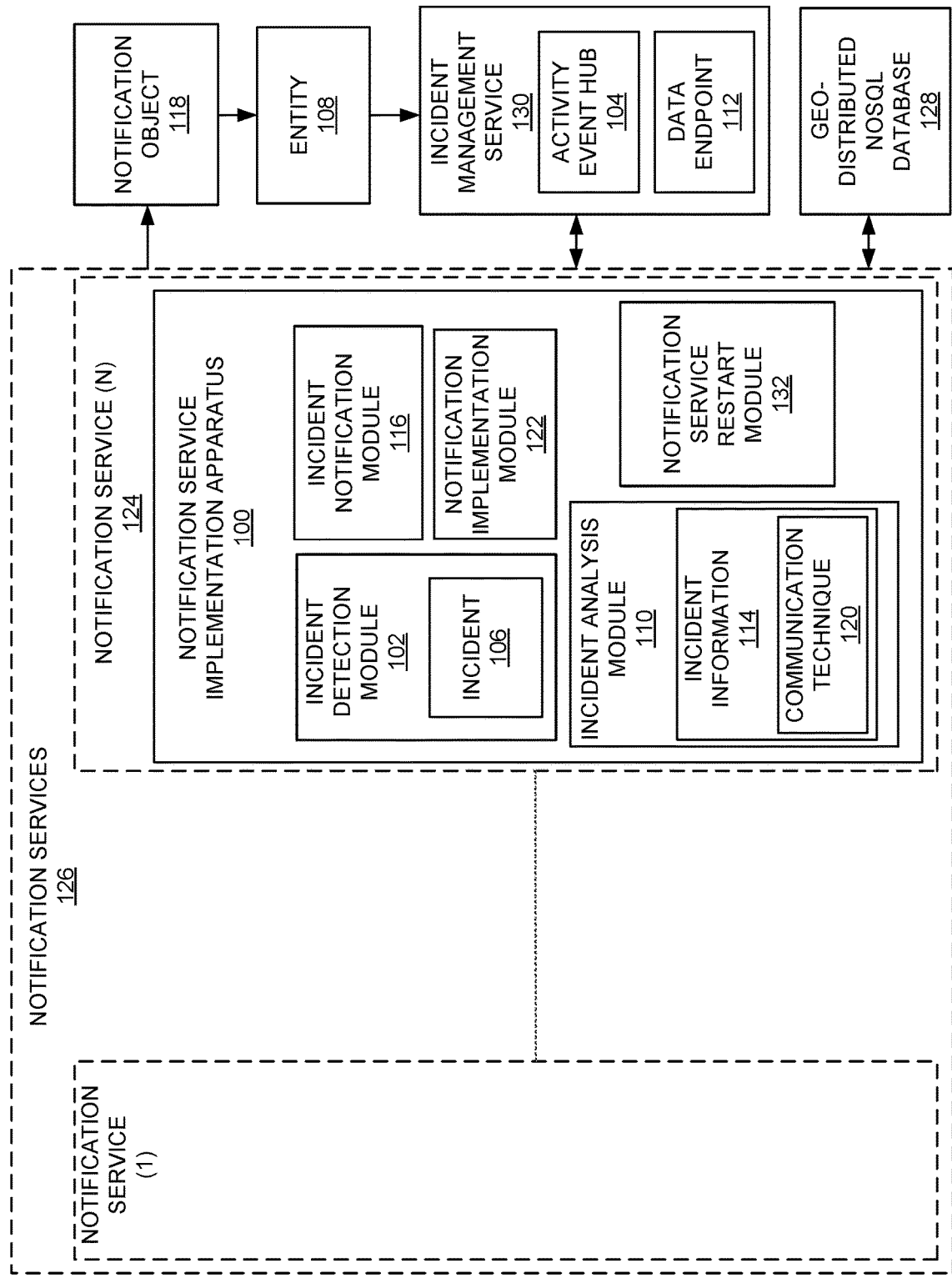
FIG. 1 illustrates a layout of a notification service implementation apparatus in accordance with an embodiment of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Notification service implementation apparatuses, methods for notification service implementation, and non-transitory computer readable media having stored thereon machine readable instructions to provide notification service implementation are disclosed herein. The apparatuses, methods, and non-transitory computer readable media disclosed herein may provide for a geo-distributed service to notify a service consumer (e.g., entity as disclosed herein) of an incident that may require an action by the service consumer, irrespective of the health of the notification service itself, with the intent of transmitting such notifications as immediately as possible (e.g., time to notify=0). The apparatuses, methods, and non-transitory computer readable media disclosed herein may provide for support of arbitrary input and communication vectors, and a resiliency and partitioning model that supports uniqueness of event handling and environment partitioning. In this regard, the notification service implemented by the apparatuses, methods, and non-transitory computer readable media disclosed herein may provide a self-monitoring service that functions precisely in all but globally catastrophic scenarios, thus removing the need for an external monitoring and notification service, while implementing stateless sub-services that do not require direct inter-service communication.

In some cases, an entity, such as a consumer, a corporation, or another such entity, may generate operational data related to various operations performed with respect to day-to-day activities of the entity. For example, as disclosed herein, the operational data may be characterized as incidents that each include an add incident state, an edit incident state, and a mitigate incident state. The add incident state, edit incident state, and mitigate incident state may correspond to initial, update, and finalization events associated with an incident. An example of an add incident state may include a new incident such as a new ticket related to a service that is down (e.g., where a service should otherwise be accessible, but is not responding), and thus a new incident indicating that an endpoint is down is created. An example of an edit incident state may include a field that monotonically increases as part of a new edit. With respect to edit incident state, the payload may be the same as an initial event (e.g., add incident state) except that the event type will differ. Further, for update events (e.g., edit incident state), there is the additional monotonically increasing field to flag the update event as triggering a notification as well as providing a sequencing structure. Such incidents may be designated as actionable incidents as disclosed herein. In this regard, it is technically challenging to analyze operational data with respect to an entity to identify an actionable incident that may need to be reported to the entity to take further action. Yet further, in some cases, a notification service that is utilized to monitor such incidents and notify the entity may itself fail. In this regard, it is also technically challenging to implement a notification service in a failsafe manner such that the notification service continues to operate to notify the entity of an incident that is actionable, even if the notification service itself fails.

In order to address at least the aforementioned technical challenges, the apparatuses, methods, and non-transitory computer readable media disclosed herein may implement a series of sub-services that may be categorized into producers, consumers, and support sub-services. The producer sub-service, which may be implemented by an incident detection module, and incident analysis module, and an incident notification module as disclosed herein, may convert an external signal into notification objects. A notification object may be described as a record containing all information needed to control and route a notification request, for example, from a notification implementation module as disclosed herein to the entity. The consumer sub-service, which may be implemented by the notification implementation module as disclosed herein, may monitor the notification object collection and emit notification along a specific vector (e.g., e-mail, in-product dashboards, third party website, short message service (SMS), etc. Further, the support sub-services, which may also be implemented by the incident analysis module, may provide internal resource translations (e.g., mapping service cluster outages to tenants with resources on that cluster that should be notified, syncing those mappings, cleaning resources, etc. . . . ).

According to a specific implementation of the apparatuses, methods, and non-transitory computer readable media disclosed herein, for a Power BI™ service implementation, the incident detection module may be linked to an incident management service activity event hub, and constantly poll the activity event hub for possible incident management service events of interest. An event may be described as any published change to the incident record. When an event of interest is found, an incident management service data endpoint (e.g., an Odata™ endpoint) may be queried for that event, and if the event meets the minimum requirements for generating a notification object (e.g., based on data in specific fields of the record), a notification object may be sent to the entity for whom the associated notification service is provided, and written to a database, such as a distributed geo-distributed NoSQL database, an example of which may include a Cosmos Db™. In this regard, other types of databases, instead of the geo-distributed NoSQL database, may be utilized. A unique identifier may be used for each incident management service event (e.g., each actionable incident). Thus, if multiple instance of the apparatuses, methods, and non-transitory computer readable media in different Power BI™ clusters attempt to write the same notification object to the geo-distributed NoSQL database, the first attempt may succeed, and following attempts may collide and may be discarded.

Each clusters incident notification module may poll the notification object collection for a specific look-back window, and when a notification object is discovered, a handling object may be created in another geo-distributed NoSQL database (e.g., Cosmos Db™) collection. In this regard, the event identifier concatenated with an attempt number may be used as a locking mechanism (e.g., using the same process as used by the notification objects) for handling the notification object as well as a process by which orphaned handling attempts may be reprocessed if a failure occurs mid-handling. Another lock entry in the notification object collection may be created upon successful handling of the notification object. Emails may be sent via an e-mail service after creating an e-mail service email object out of the notification object data, mapping data in a geo-distributed NoSQL database (e.g., when needed), and the e-mail enabled security group designated by a tenant administrator upon opt-in to the notification service provided by the apparatuses, methods, and non-transitory computer readable media disclosed herein.

According to examples disclosed herein, the apparatuses, methods, and non-transitory computer readable media disclosed herein may provide integration of internal monitoring systems with external communications. The apparatuses, methods, and non-transitory computer readable media disclosed herein may curate communications about system health, and in what ways a customer may be affected by a behind-the-scenes event. The notification service provided by the apparatuses, methods, and non-transitory computer readable media disclosed herein may thus enable a customer to be informed at the same time as internal support personnel of the issue.

According to examples disclosed herein, the apparatuses, methods, and non-transitory computer readable media disclosed herein may provide for self-reporting. In this regard, if the notification service implemented by the apparatuses, methods, and non-transitory computer readable media disclosed herein fails, a customer (e.g., entity as disclosed herein) may still be notified of an actionable incident, even though the mechanism to communicate with the customer was in the notification service that has failed. These aspects may be implemented by the geo-redundancy of notification services utilizing a geo-distributed NoSQL database.

The apparatuses, methods, and non-transitory computer readable media disclosed herein may thus provide an integrated self-reporting notification mechanism that retains the ability to self-report in situations that affect operation of the apparatuses themselves. For example, as long as not all global instances of the apparatuses, methods, and non-transitory computer readable media disclosed herein are affected by an outage simultaneously, the apparatuses, methods, and non-transitory computer readable media disclosed herein may retain the ability to self-report in situations that affect operation of the apparatuses themselves.

According to examples disclosed herein, the apparatuses, methods, and non-transitory computer readable media disclosed herein may provide for generation of arbitrary alert and notification vectors with arbitrary parameterized notification content. In this regard, alert sources may be added (e.g., multiple incident management services) and notifier sub-systems may be added (e.g., email handler, in-product notification, SMS handler, automated phone call generator, etc. . . . ).

According to examples disclosed herein, the apparatuses, methods, and non-transitory computer readable media disclosed herein may provide for near-real-time notifications.

According to examples disclosed herein, the apparatuses, methods, and non-transitory computer readable media disclosed herein may be distributed to provide further benefits such as resiliency, redundancy, and a de-duplication model that relies on a central database's ability to support user requests and primary table keys.

According to examples disclosed herein, the apparatuses, methods, and non-transitory computer readable media disclosed herein may provide active (as opposed to solely passive) notification support. For example, the apparatuses, methods, and non-transitory computer readable media disclosed herein may provide email notifications instead of a server health dashboard that may need to be visited by a consumer when an outage is suspected.

According to examples disclosed herein, the notification service provided by the apparatuses, methods, and non-transitory computer readable media disclosed herein may be designated as a time-to-notify-zero service. In this regard, the time-to-notify-zero service may report an actionable incident to an entity for whom the notification service is provided without requiring for the entity to request or otherwise monitor for actionable incidents.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates a layout of an example notification service implementation apparatus (hereinafter also referred to as "apparatus 100").

Referring to FIG. 1, the apparatus 100 may include an incident detection module 102 to detect, with respect to a notification service 124 of a plurality of notification services 126, based on an analysis of signals received at an activity event hub 104 of an internal incident management service 130 of an entity 108, at least one incident 106 associated with activities of the entity 108.

According to examples disclosed herein, the incident detection module 102 may detect, with respect to the notification service 124 of the plurality of notification services 126, based on the analysis of signals received at the activity event hub 104 of the internal incident management service 130 of the entity 108, the at least one incident 106 from a set of incident states that include an add incident state, an edit incident state, and a mitigate incident state associated with the activities of the entity 108.

An incident analysis module 110 may determine, based on an analysis of the at least one detected incident 106, whether the at least one detected incident 106 is actionable.

According to examples disclosed herein, the incident analysis module 110 may determine, based on the analysis of the at least one detected incident 106 from a plurality of detected incidents that include the at least one detected incident 106 that is actionable and at least one further detected incident that is non-actionable, whether the at least one detected incident 106 is actionable.

According to examples disclosed herein, the incident analysis module 110 may determine, based on the analysis of the at least one detected incident 106, whether the at least one detected incident 106 is actionable by analyzing an event type associated with the at least one detected incident 106.

Based on a determination that the at least one detected incident 106 is actionable, the incident analysis module 110 may request, from a data endpoint 112 of the internal incident management service 130 of the entity 108, information 114 related to the at least one detected incident 106. The information 114 may also be designated "incident information 114" as disclosed herein. The incident analysis module 110 may receive, based on the request, the information 114 related to the at least one detected incident 106.

According to examples disclosed herein, the incident analysis module 110 may request, from the data endpoint 112, the information 114 that includes an indication of whether an action is to be performed with respect to the at least one detected incident 106.

An incident notification module 116 may generate, based on the received information 114 related to the at least one detected incident 106, a notification object 118 to notify the entity 108 of the at least one detected incident 106. An example of a notification object may be specified as follows:

```
{
id: [incident identifier]-[incident event identifier]
Timestamp:
NotificationScopeType: e.g., 'Tenant'
NotificationScope: Tenant A's Id
NotificationType: e.g., 'Email'
Notification Parameters: Email template and parameters
}
```

According to examples disclosed herein, the incident notification module 116 may generate, based on the received information 114 related to the at least one detected incident 106, the notification object 118 that specifies details of the at least one detected incident 106 and an indication of a communication technique 120 that is to be utilized to communicate the at least one detected incident 106 to the entity 108.

According to examples disclosed herein, the incident notification module 116 may specify the communication technique 120 that includes an e-mail, an internal notification service notification (e.g., a notification provided at a user interface of the notification service 124), and/or a short message service (SMS), to communicate the details of the at least one detected incident 106 to the entity 108.

According to examples disclosed herein, the incident notification module 116 may store, with respect to the notification service 124, by utilizing a database 128 that is commonly used for storage by the plurality of notification services 126, further information related to the at least one detected incident 106.

A notification service restart module 132 may perform, in an event of a failure of the notification service 124, a stateless restart associated with the notification service 124 based on the stored further information related to the at least one detected incident 106.

A notification implementation module 122 may perform the communication technique 120 to communicate the at least one detected incident 106 to the entity 108.

According to examples disclosed herein, the incident detection module 102 may detect, with respect to a notification service 124 of a plurality of notification services 126, based on the analysis of signals received at the activity event hub 104, the at least one incident 106 associated with the activities of the entity 108. For example, as shown in FIG. 1, the notification services 126 may include N notification services (e.g., three notification services 126 shown in the example of FIG. 6). Further, the incident notification module 116 may store, with respect to the notification service 124, by utilizing the database 128, such as a geo-distributed not only structured query language (NoSQL) database 128 that is commonly used for storage by the plurality of notification services 126, the further information related to the at least one detected incident 106.

According to examples disclosed herein, the incident notification module 116 may store, with respect to the notification service 124, by utilizing the geo-distributed NoSQL database 128 that is commonly used for storage by the plurality of notification services 126, the further information that includes a primary key associated with the at least one detected incident 106.

According to examples disclosed herein, the incident detection module 102 may detect, with respect to the notification service 124 of the plurality of notification services 126 that are each geographically located at different geographic locations, based on the analysis of signals received at the activity event hub 104 of the internal incident management service 130 of the entity 108, the at least one incident 106 associated with the activities of the entity 108.

According to examples disclosed herein, the incident detection module 102 detect, with respect to the notification service 124 of the plurality of notification services 126 that include at least three notification services, based on the analysis of signals received at the activity event hub 104 of the internal incident management service 130 of the entity 108, the at least one incident 106 associated with the activities of the entity 108.

Operation of the apparatus 100 is described in further detail with reference to FIGS. 1-8.

Figure 2:
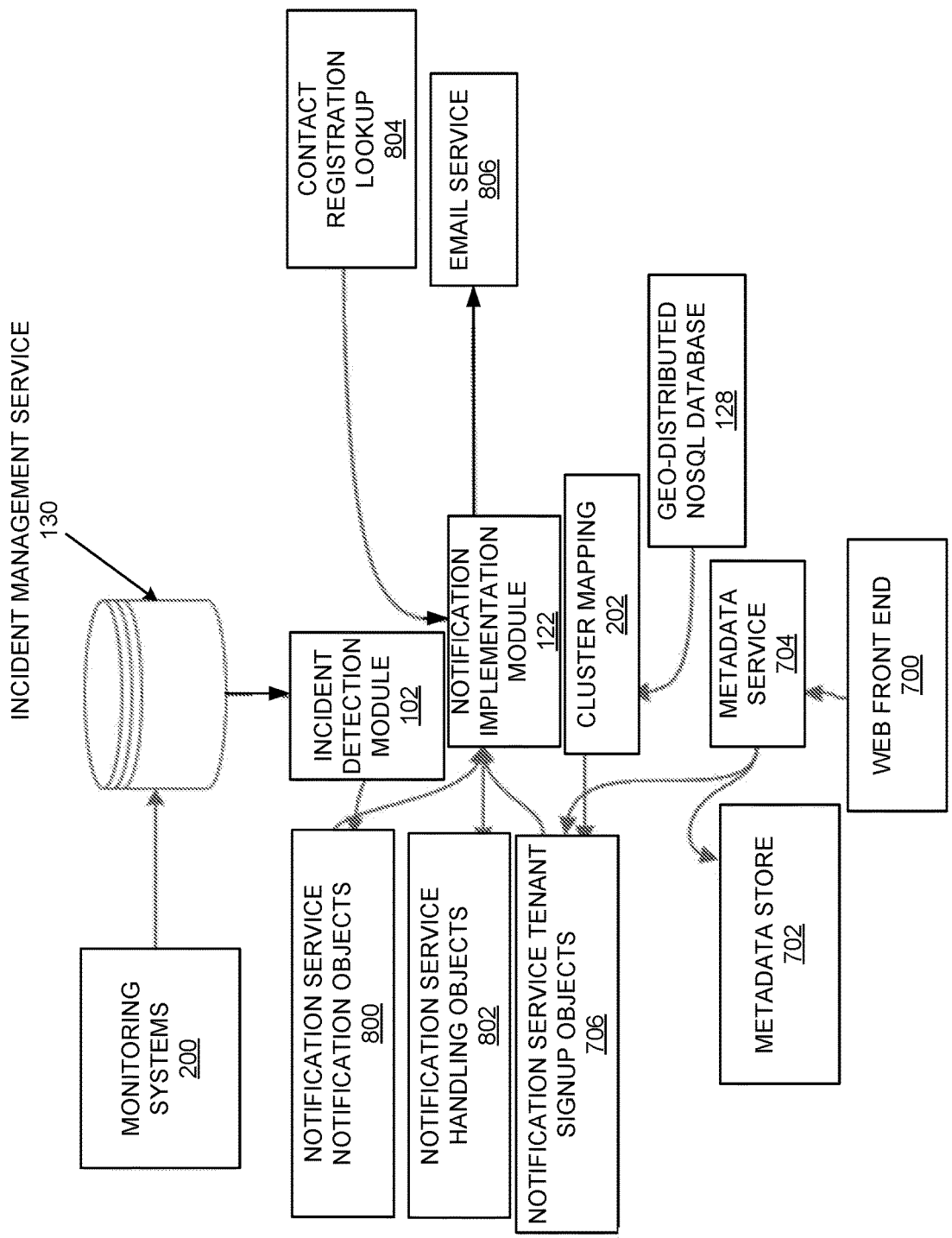
FIG. 2 illustrates a logical flow to illustrate operation of the notification service implementation apparatus of FIG. 1 in accordance with an embodiment of the present disclosure.

FIG. 2 illustrates a logical flow to illustrate operation of the apparatus 100 in accordance with an embodiment of the present disclosure. The features of FIG. 2 will be described in conjunction with the features of FIGS. 3-8, starting with a description of FIGS. 3-8. In this regard, FIG. 2 is generally inclusive of the features of FIGS. 3-8, with FIGS. 3-8 each describing logically related features of FIG. 2.

Figure 3:
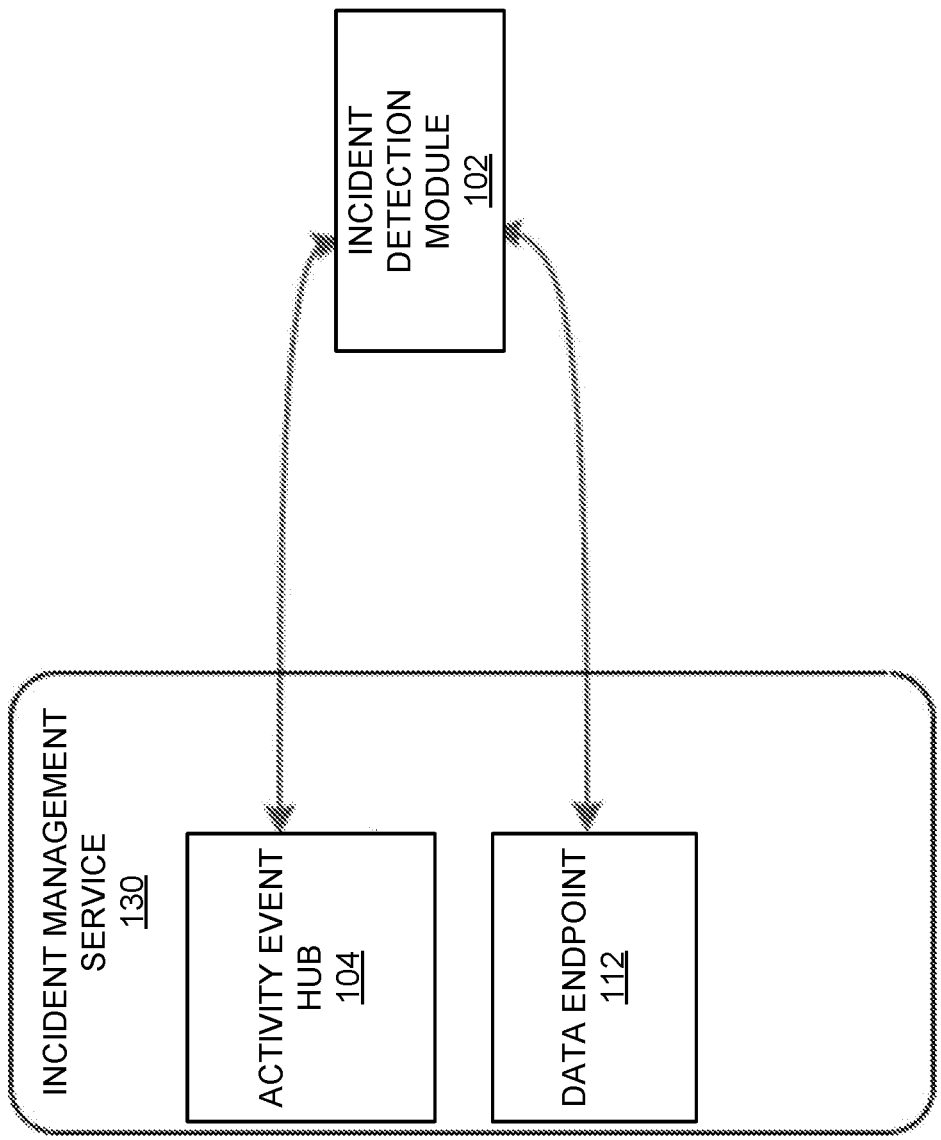
FIG. 3 illustrates an input signal logical flow of the notification service implementation apparatus of FIG. 1 in accordance with an embodiment of the present disclosure.

FIG. 3 illustrates an input signal logical flow of the apparatus 100 in accordance with an embodiment of the present disclosure.

Referring to FIGS. 1-3, and particularly FIG. 3, an incident management service 130 may receive, at an activity event hub 104, signals related to activities of an entity 108. The activities may be detected by one or more monitoring systems 200 as shown in FIG. 2. According to examples disclosed herein, the incident management service 130 may include a Microsoft™ Incident Management System. According to examples disclosed herein, the entity 108 may include any type of enterprise, organization, etc. The activities may include, for example, any type of functional activities associated with operation of the entity 108. For example, the activities may include an incident associated with an operation of the entity 108.

The incident management service 130 may represent a tool for handling service investigations and incidents associated with the entity 108. The incident management service 130 may provide for monitoring of signals in an implementation-agnostic manner to thus align with existing internal monitoring assets of the entity 108. According to an example, the incident management service 130 may provide for monitoring for a Power BI™ (PBI) service. In this regard, the notification service as disclosed herein may be provided for any other underlying service's health status, other than the PBI™ service.

The incident detection module 102 may implement the notification service disclosed herein by communicatively connecting to the activity event hub 104. The incident detection module 102 may decode associated data and parse for relevant incidents from the activity event hub 104. For example, the incident detection module 102 may analyze an event to determine whether the event is of a relevant event type and owning service name. In this regard, the incident detection module 102 may query the activity event hub 104 to determine whether the event is actionable. An example of an activity event hub snippet is as follows:

```
...
ABC.IncidentDataSource'='PROD'
ABC.IncidentId'='177327211'
ABC.Title'='Service is unhealthy.'
ABC.Severity'='0'
ABC.Status'='<null>'
ABC.EventType'='IncidentAdd'
ABC.Owner'='<null>'
ABC.OwningServiceName'='PowerBI'
...
```

For the snippet above, "IncidentDataSource" may be described as the instance of the incident provider (e.g., FIG. 4, incident management service 130), "IncidentId" may be described as a unique identifier for the incident (not consumed by the notification service), "Title" may be described as a descriptive title of the incident, "Severity" may be described as a severity level of the incident (not consumed by the notification service), "Status" may be described as a status of the incident (not consumed by the notification service), "EventType" may be described as a type of change committed to the record—checked for control flow and merged with the identification for the ID+Event primary key, "Owner" may be described as an owner of the incident (not consumed by the notification service), and "OwningService" may be described as a service against which the incident was levied—checked to see if the target is appropriate for processing (is relevant/is actionable).

Data that is analyzed with respect to the activity event hub 104 may include a service name (e.g., owning service name) that is being targeted with respect to the incident, and an event type. An example of an incident that is not actionable may include a service that is not in a specified service list (e.g., an Excel™ incident). An example of an incident that is actionable may include a service related, for example, to a Power BI™ (PBI) service (e.g., where the service name is Power BI™). For example, event types for incidents that are actionable may include an add incident state, an edit incident state, and a mitigate incident state. In this regard, other event types such as closed incident, etc., may be specified as being non-actionable. An example of an add incident state may include a new incident such as a new ticket related to a service that is down (e.g., where a service should otherwise be accessible, but is not responding), and thus a new incident indicating that an endpoint is down is created. Another example of an edit incident state may include a field that monotonically increases as part of a new edit.

For relevant incident actions (e.g., incidents that are actionable), the incident analysis module 110 may query the data endpoint 112 for more information 114 (e.g., incident information 114) about the incident 106. According to an example, the data endpoint 112 may be an open data protocol (OData) endpoint, where the open data protocol may represent a REST application programming interface (API) protocol. The information 114 about the incident 106 may include any type of information that specifies whether an action (e.g., an alert) is to be taken with respect to the incident 106. For example, an incident 106 related to a prototype deployment of a service may not need to be notified to a customer (e.g., the entity 108), whereas an incident 106 related to an operational deployment of a service may need to be notified to the customer. An example of a data endpoint 112 snippet, which would generate a notification object since it has data in the relevant IncidentNotification custom fields, is as follows:

```
...
{
  "Id": "177327211",
  "Severity": 3,
  "Status": "IncidentAdd",
  "Title": "Service is unhealthy.",
  "OwningTeamId": "POWERBI\\LiveSite",
  "MitigationData": {
  "ImpactStartDate": "2020-05-26T11:38:21.73Z",
  "CustomFieldGroups": [
    {
      "ContainerId": "10058",
      "GroupType": "Tenant",
      "CustomFields": [
        {
          "Name": "NotificationParameters",
          "DisplayName": "Notification Parameters",
          "Value": "{
            \EmailTemplateProperties\": {
              \"IncidentAddTemplateId\":
              \"incidentadd-tenant-basic-notification\",
              \"IncidentAddTemplateParameters\": {
                \"Message\":
                  \"An incident that may affect your ability to use the service has been detected\",
              }
              \"EditTemplateId\": \"edit-tenant-basic-notification\",
              \"EditTemplateParameters\": {
                \"Message\": \"Next update will be in 1 hour.\",
              }
              \"MitigateTemplateId\":
              \"mitigate-tenant-basic-notification\",
              \"MitigateTemplateParameters\": {
                \"Message\": \"The incident has been resolved.\",
              }
            }
          }",
          "Type": "BigString"
        },
        {
          "Name": "NotificationUpdateIteration",
          "DisplayName": "Notification Update Iteration",
          "Value": "",
          "Type": "Integer"
        },
        {
          "Name": "NotificationCorrelationId",
          "DisplayName": "Notification Correlation Id",
          "Value": "",
          "Type": "ShortString"
        },
        {
          "Name": "NotificationImpactScope",
          "DisplayName": "Notification Impact Scope",
          "Value": "00000000-0000-0000-0000-000000000000",
          "Type": "BigString"
        },
        {
          "Name": "NotificationImpactScopeType",
          "DisplayName": "Notification Impact Scope Type",
          "Value": "Tenant",
          "Type": "ShortString"
        }
      ]
    }
  ]
}
...
```

For the snippet above, the ID and status may determine the notification object ID and primary key, and the custom fields may form the remainder of the non-timestamp notification object payload fields.

If the information related to the incident 106 is actionable, the incident notification module 116 may convert an external signal associated with the incident 106 into an internal notification object 118. For example, the internal notification object 118 may specify details of the incident 106, how the incident 106 is to be communicated, and who with respect to the entity 108 is to be advised of the incident 106. In this regard, an example notification object (where unique primary key is the identification) snippet is as follows:

```
{
  "Id": "177327211-IncidentAdd",
  "Timestamp": "2020-05-26 00:00:00",
  "ImpactScopeType": "Tenant",
  "ImpactScope": "00000000-0000-0000-0000-000000000000",
  "NotificationParameters": {
    "EmailTemplateProperties": {
      "IncidentAddTemplateId": "incidentadd-tenant-basic-notification",
      "IncidentAddTemplateParameters": {
        "Message": "An incident that may affect your ability to use the service has been detected",
      }
      "EditTemplateId": "edit-tenant-basic-notification",
      "EditTemplateParameters": {
        "Message": "Next update will be in 1 hour.",
      }
      "MitigateTemplateId": "mitigate-tenant-basic-notification",
      "MitigateTemplateParameters": {
        "Message": "The incident has been resolved.",
      }
    }
  }
}
```

For the snippet above, the ID and status may determine the notification object ID and primary key, and the custom fields may form the remainder of the non-timestamp notification object payload fields.

Examples of incidents and notification objects are as follows.

For example, for an incident 106 that includes a severe global security breach, the notification object 118 may specify a type of the notification as Notificationimpactscopetype=Global, and a scope of the notification as Notificationimpactscope=Global.

According to another example, for an incident 106 that includes a cluster in read-only (R/O) mode due to failover, the notification object 118 may specify a type of the notification as Notificationimpactscopetype=Cluster, and a scope of the notification as Notificationimpactscope=CanCen.

According to another example, for an incident 106 that includes capacity resources unavailable, the notification object 118 may specify a type of the notification as Notificationimpactscopetype=Capacity, and a scope of the notification as Notificationimpactscope=(guid) c. The "(guid) c" may represent a specific data type, a globally unique identifier—these may be identifiers for specific types of entities (c=capacity, t=tenant, etc. . . . ).

According to another example, for an incident 106 that includes tenant settings lost, the notification object 118 may specify a type of the notification as Notificationimpactscopetype=Tenant, and a scope of the notification as Notificationimpactscope=(guid) t.

According to another example, for an incident 106 that includes user data deleted, the notification object 118 may specify a type of the notification as Notificationimpactscopetype=User, and a scope of the notification as Notificationimpactscope=(guid) t.

In order to support per-environment (e.g., train stage) data and resource isolation, there may be a set of activity event hubs per environment, targeting the environment's routing manager (e.g., incident notification module 116) where possible.

Figure 4:
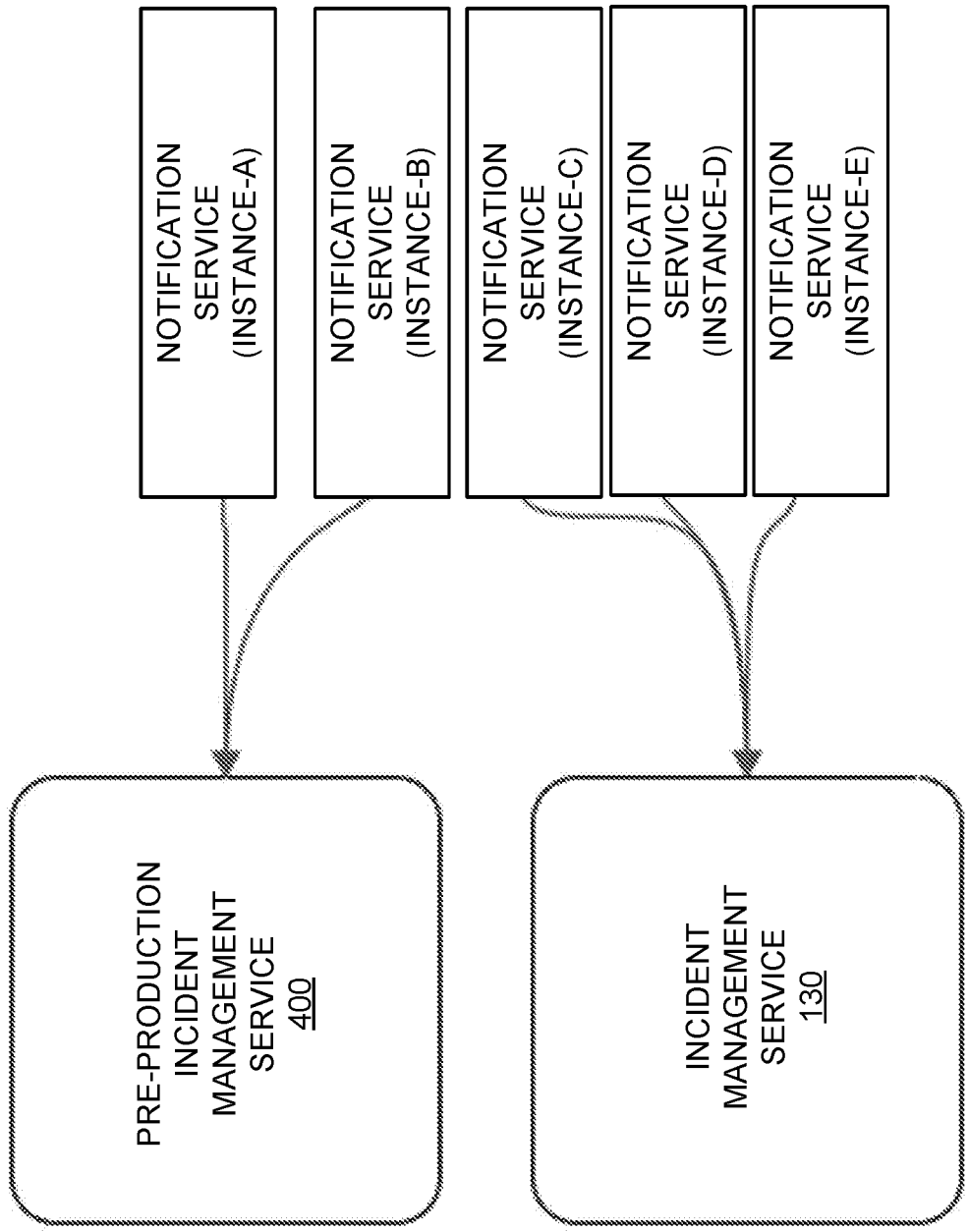
FIG. 4 illustrates a shared input resources logical flow of the notification service implementation apparatus of FIG. 1 in accordance with an embodiment of the present disclosure.

FIG. 4 illustrates a shared input resources logical flow of the apparatus 100 in accordance with an embodiment of the present disclosure.

Referring to FIGS. 1-4, and particularly FIG. 4, in order to ensure environments (e.g., notification services 126 as disclosed herein), such as PowerBI™ safe deployment practices (SDP), which represent release environment staging, are isolated when several environments use the same specific resource (e.g., activity event hub 104), early release environments, such as pre-DXT PowerBI™ environments (e.g., instance-A and instance-B), may utilize pre-production incident management service 400 resources, and other early release environments such as DXT, MSIT, and PROD may utilize production instance (e.g., instance-C, instance-D, and instance-E), such as an incident management service 130 instance, resources. The pre-production incident management service 400 resources may be identical to the incident management service 130, but may instead target early release environments, such as pre-DXT PowerBI™ environments.

These environments may be isolated by creating an encoded mapping between a top-level incident management service field enumeration and environments, such as the PowerBI™ environments. This setup may enforce isolation of input signals to a specific environment, such as the PowerBI™ environment.

Yet further, sovereign clouds may be isolated by their service differentiation in the incident management service ServiceTree. In this regard, since "Service" may be a top level field of incidents, and may be used for incident/event behavior filtering, a new "Service" may be introduced to divide behavior across categories.

Figure 5:
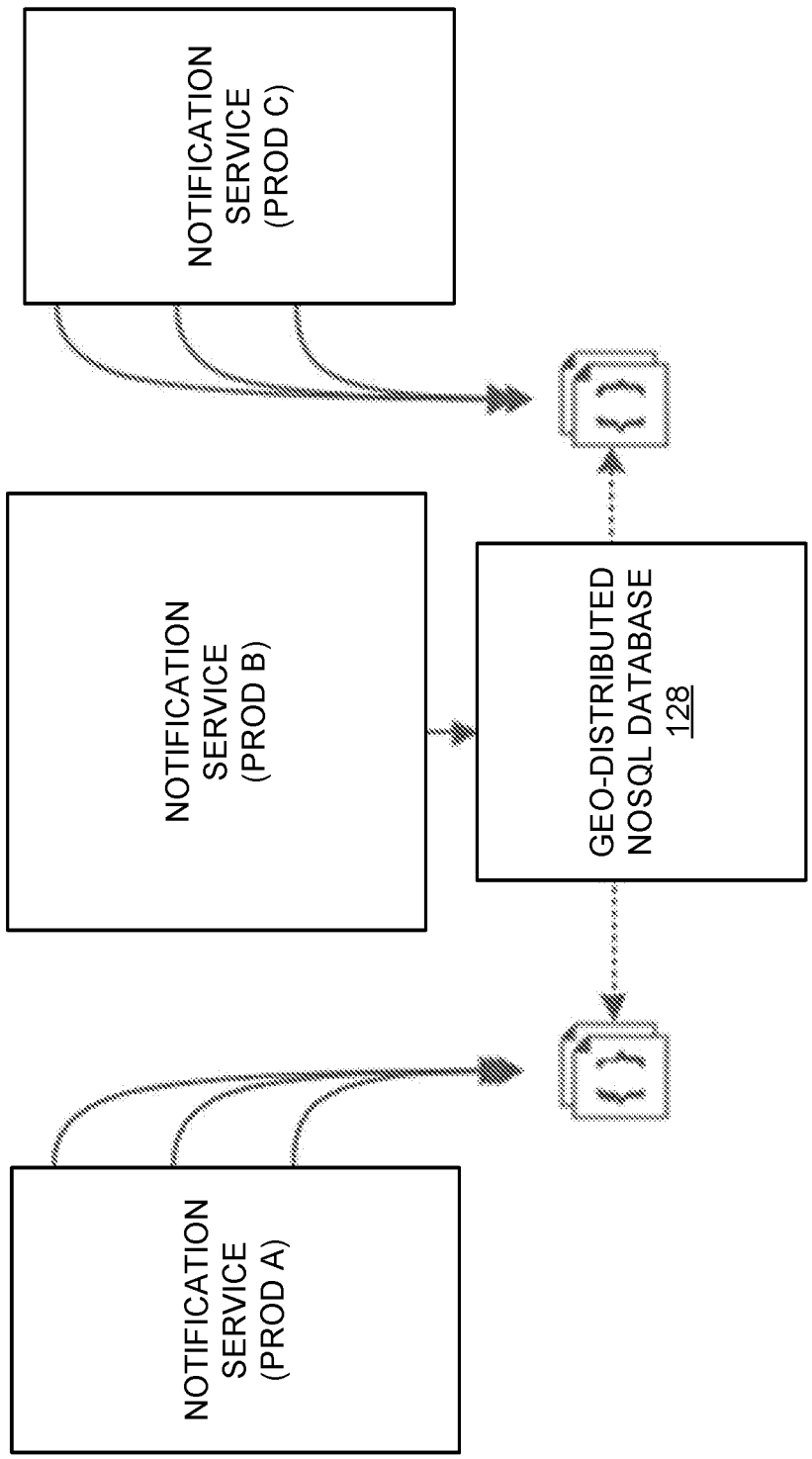
FIG. 5 illustrates a sub-service and service instantiation coordination logical flow of the notification service implementation apparatus of FIG. 1 in accordance with an embodiment of the present disclosure.

FIG. 5 illustrates a sub-service and service instantiation coordination logical flow of the apparatus 100 in accordance with an embodiment of the present disclosure.

With respect to FIG. 5, in order for the notification service to be self-reporting, assuming that a cluster (e.g., a notification service of the notification services 126) is present in a specified region in which the notification service at the specified region is down, to address such an event, the geo-distributed NoSQL database 128 (e.g., a Cosmos Db™) may be utilized. Once a notification object is created, the notification object may include all of the information that is needed to send a notification (e.g., e-mail). In this regard, a primary key (PKey) derived from an identification of the incident 106 (e.g., PKey=40–IndicentAdd) may be utilized to identify the incident 106. If one cluster (e.g., one of the notification services) goes down in one region, another cluster in another region may continue to send notifications on outages. In this regard, the multiple instantiations of the notification services (e.g., notification service (Prod A), notification service (Prod B), etc., as shown in FIG. 5) may not communicate with each other, but may instead utilize a primary key to write to the geo-distributed NoSQL database 128. Thus, based on the use of the primary key, multiple notifications may not be redundantly sent for the same incident 106.

Referring to FIGS. 1-5, and particularly FIG. 5, the notification service provided by the apparatus 100 may utilize the geo-distributed NoSQL database 128 (e.g., a Cosmos Db™) as its data store for passing information between subservices. The geo-distributed NoSQL database 128 may also implement storage of incident payload information for actionable incidents. These aspects may also provide for resilient stateless instantiations of the notification service to interact without missing or over-sending notifications.

The utilization of the geo-distributed NoSQL database 128 may also provide for utilization of create document logic over an identifier, such as a primary key (PKey) that is a unique identifier for a record, as a locking mechanism for cross-instantiation coordination. In this regard, an example notification object (where unique primary key is the identification) snippet is as follows:

```
{
  "Id": "177327211-IncidentAdd",
  "Timestamp": "2020-05-26 00:00:00"
  "ImpactScopeType": "Tenant",
  "ImpactScope": "00000000-0000-0000-0000-000000000000",
  "NotificationParameters": {
    "EmailTemplateProperties": {
      "IncidentAddTemplateId": "incidentadd-tenant-basic-
         notification",
      "IncidentAddTemplateParameters": {
        "Message": "An incident that may affect your ability to use
the service has been detected",
      }
      "EditTemplateId": "edit-tenant-basic-notification",
      "EditTemplateParameters": {
        "Message": "Next update will be in 1 hour.",
      }
      "MitigateTemplateId": "mitigate-tenant-basic-notification",
      "MitigateTemplateParameters": {
        "Message": "The incident has been resolved.",
      }
    }
  }
}
```

The utilization of the geo-distributed NoSQL database 128 may also provide for geo-location database replication that provides resilience, self-reporting, and maximally efficient database referencing for in-product interfaces. In this regard, the databases in the different locations (each serving a live instance of the notification service) may be set to replicate at a high consistency level to keep them in sync, to this provide for locking as disclosed herein. With respect to locking, the (uniqueness-enforced) primary key's identifying relation to the attempted activity and the requirement that a new handling object be written with that primary key being used as a semaphore for attempted activity (success is required before proceeding) may provide the described locking mechanism.

According to examples disclosed herein, the geo-distributed NoSQL database 128 may be implemented to include the following specifications. Specifically, each geo-distributed NoSQL database 128 (if more than one is utilized) may include all notifications related data. The geo-distributed NoSQL database 128 may include a single write region (e.g., close to the incident management service 130), and a read region as per a deployment plan. For the geo-distributed NoSQL database 128, examples of fields may include InternalIncidentId (e.g., mapping to the incident management service 130 incident identification), ExternalIncidentId (e.g., externally visible identification that can be used to correlate different notifications to a same issue, where for incident management service 130 generated incidents, this value will be mapped from InternalIncidentID), NotificationID (e.g., uniquely identifies the specific document (message)), and IncidentStartTime (e.g., start of the incident 106). Further fields may include TimeStamp (e.g., time in which this specific notification was created), NotificationType (e.g., start, mitigated, update, etc.), Notification Title (e.g., may be used in "history" as a title for grouping all messages), and NotificationText (e.g., actual test to be shown to a user, or Notification Message identification that maps to a "notification class"). Additional fields may include ImpactScope (a definition of the target of the notification, such as Global (e.g., all or some entities that are or may be impacted), cluster (all users of tenants that are hosted), TenantId (e.g., all users of the tenant), and PartitionKey (e.g., a combination of impact-scope and date). The tenant may be described as a customer unit/category.

Figure 6:
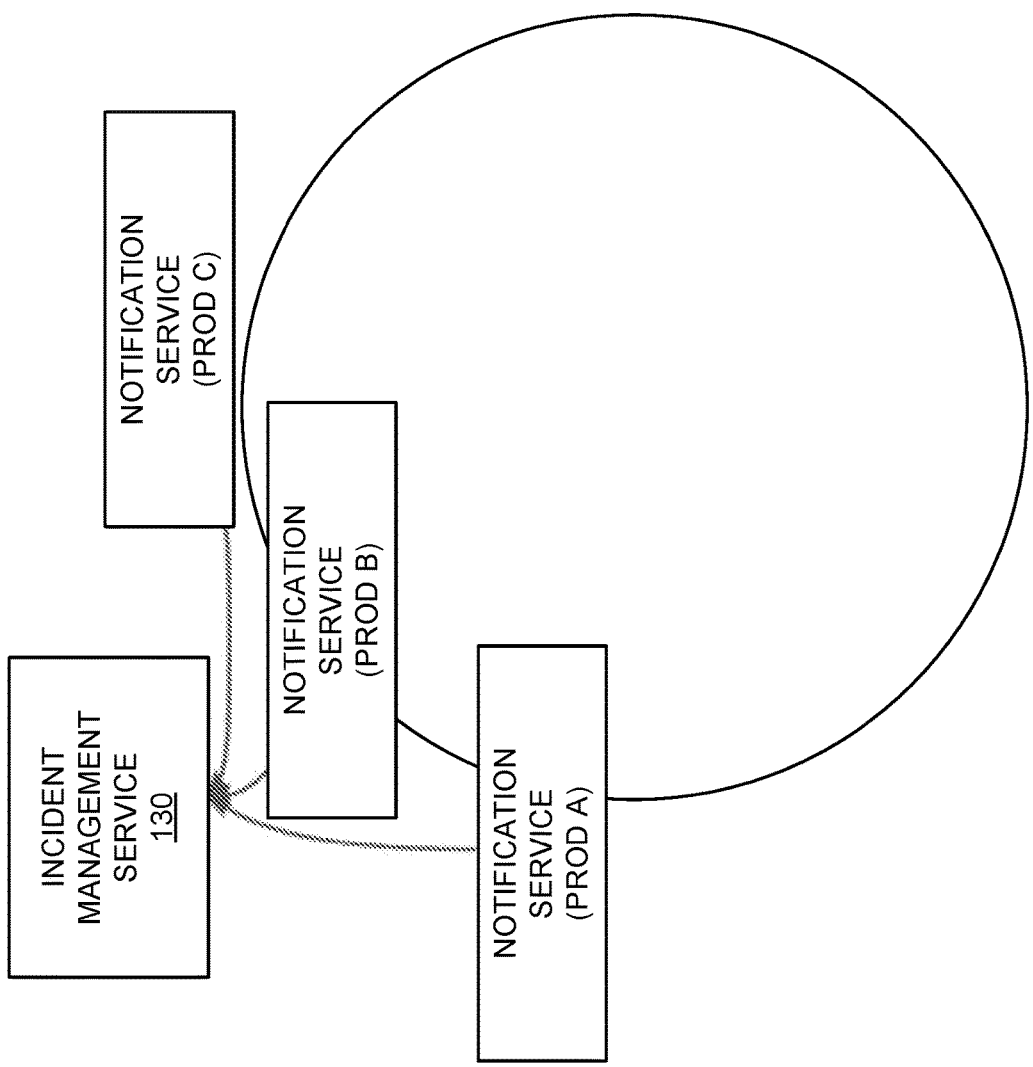
FIG. 6 illustrates a multiple service model logical flow of the notification service implementation apparatus of FIG. 1 in accordance with an embodiment of the present disclosure.

FIG. 6 illustrates a multiple service model logical flow of the apparatus 100 in accordance with an embodiment of the present disclosure.

Referring to FIGS. 1-6, and particularly FIG. 6, in order to ensure functionality of the notification service provided by the apparatus 100 if the containing service, such as the PowerBI™ service, itself fails, a configuration-specified number (e.g., three as shown in FIG. 6) of singleton-per-cluster notification services may operate concurrently in different geographic locations. Thus, in order to achieve self-reporting, multiple notification services (e.g., three as shown in FIG. 6) may be operated concurrently in different locations.

For example, as shown in FIG. 6, the different locations may include three locations closest to the activity event hub 104. This implementation may maximize resiliency while minimizing excess load on the underlying geo-distributed NoSQL database 128 and resources associated with the activity event hub 104.

Figure 7:
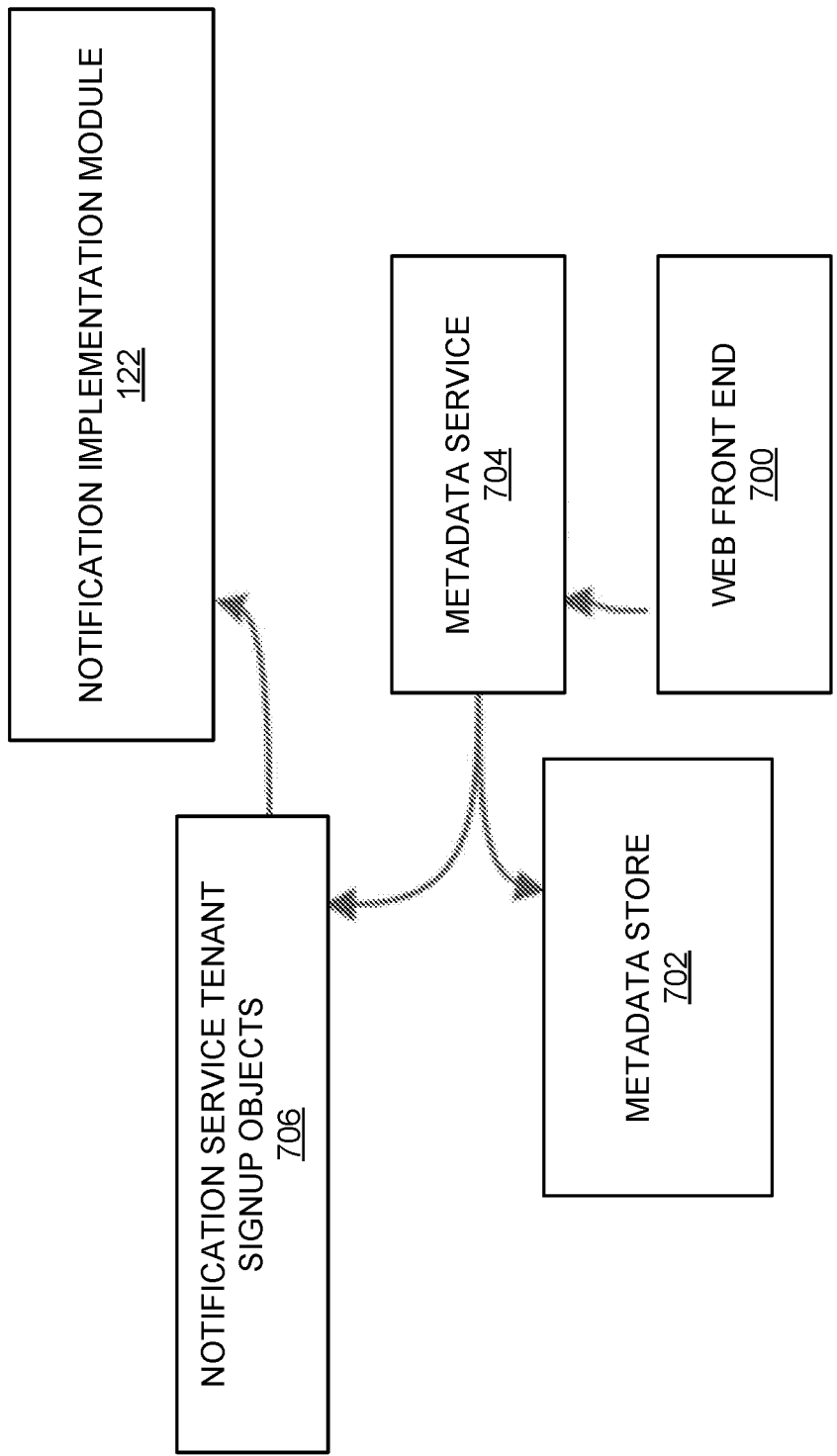
FIG. 7 illustrates a tenant notification opt-in logical flow of the notification service implementation apparatus of FIG. 1 in accordance with an embodiment of the present disclosure.

FIG. 7 illustrates a tenant notification opt-in logical flow of the apparatus 100 in accordance with an embodiment of the present disclosure.

Referring to FIGS. 1-7, and particularly FIG. 7, with respect to a web front end 700 of the apparatus 100, a tenant administrator (e.g., administrator with respect to the entity 108) may make a change to a setting, for example, in the Power BI™ service. In this regard, in some examples, all actions performed by the administrator to change the setting may be written to a metadata store 702 through a metadata service 704. Data may be forked upon write to the notification service tenant signup objects 706. The signup objects may represent the opt-in tracking mechanism that tell the notification service if someone would like to be notified and know how to notify them. When an incident is actionable (e.g., the incident 106), based on the primary key being the tenant ID, a security group ID may be determined. The security group ID may represent a unique identifier of the contact group provided during the opt-in action. From the security group ID, a mapping for the security group ID may be determined, and an e-mail destination list may be determined based on the mapping. The mapping may represent the translation of the security group ID to an email list. The cluster mapping 202 of FIG. 2 is an example of a target-scopetype support service that translates a cluster ID to a group of customers affected by an incident on that cluster (which is then translated to contact information). The e-mail destination list may be utilized by the notification implementation module 122 to send an e-mail notification (or another type of notification) as needed to the entity 108.

Referring to FIG. 7, an administrator page, such as the tenant administrator page of Power BI™, may offer an opt-in section for initiating the notification service provided by the apparatus 100. This opt-in section may allow an administrator to elect a set of e-mail-enabled security groups to receive e-mails when there is a service degradation (e.g., for notification of the incident 106).

A payload, which may represent information or a message in transmitted data, may be attached to the web service code for this interaction that informs a metadata service, such as the PowerBI™ metadata service for handling, storing, and fetching metadata and settings, to fork a tenant administrator switch information to a notification database to minimize any effect of notification operations on existing services, such as customer interactions. In this regard, an internal application programming interface (API) call may be extended with a tag that invokes the additional behavior of the notification service database write as follows:

{key: TTN0EmailSecurityGroups, value: 00000000-0000-0000-0000-000000000000;
TTN0DbWriteEnabled: true}

The utilization of e-mail enabled security groups may remove personally identifiable information concerns, and allow for the storage of the security group's identification. Further, the utilization of e-mail enabled security groups may provide for look-up of activity directory information, such as the Azure™ activity directory information, with the activity directory information being used on demand to avoid possible redirection of e-mails to external addresses.

Figure 8:
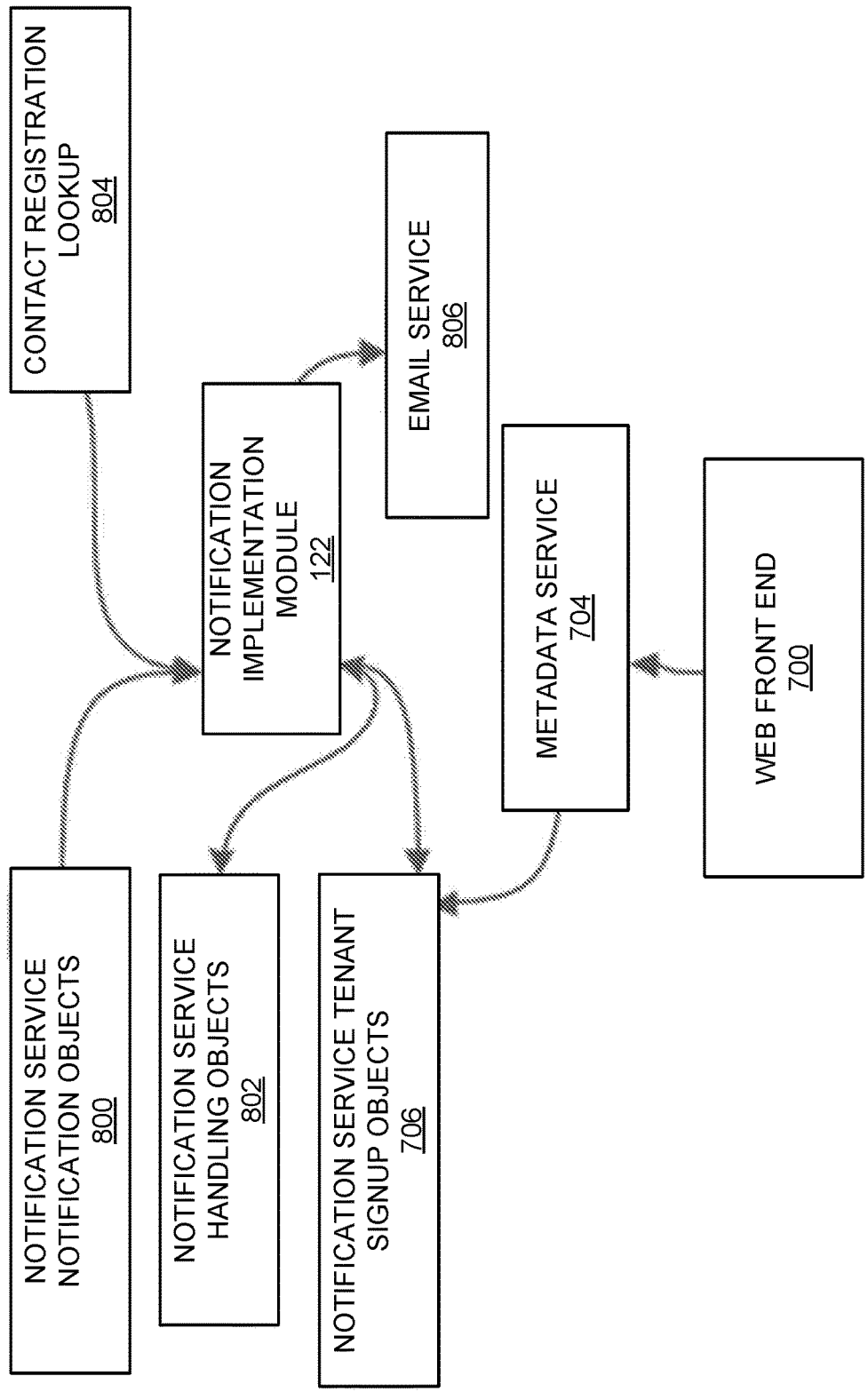
FIG. 8 illustrates an e-mail notifier subservice logical flow of the notification service implementation apparatus of FIG. 1 in accordance with an embodiment of the present disclosure.

FIG. 8 illustrates an e-mail notifier sub-service logical flow of the apparatus 100 in accordance with an embodiment of the present disclosure.

Referring to FIGS. 1-8, and particularly FIG. 8, the email notifier sub-service implemented by the notification implementation module 122 may be instantiated in a similar manner to the listener sub-service implemented by the incident detection module 102, and may follow the following activity pattern. The notification implementation module 122 may check the local geo-distributed NoSQL database 128 for notification objects (e.g., notification service notification objects 800, notification service handling objects 802, and notification service tenant signup objects 706) without an "already being handled" lock file in the local handling object collection. With respect to the "already being handled" lock file in the local handling object collection, as per the locking mechanism description for notification object with the added identifier section of the attempt number (so that as handling is attempted, but failed, a number of retries may be tracked). The notification implementation module 122 may also check for orphaned lock files that describe cases where a handling object was created but the handling never occurred (e.g., at the end of the handling of an object a completion record is written—if a sufficient time has passed since the handling object was created with no completion object having been written, the attempt is considered orphaned and retried). In this regard, the handling object (lock file) example (format may be [IncidentId]-[EventType]-[AttemptNumber]). The NotificationObject, HandlingObject, and TenantInfo collections and databases may be separate, and the handling object (lock file) may be specified as follows:

```
{
  "Id": "177327211-IncidentAdd-1",
  "Timestamp": "2020-05-26 00:00:00"
}
```
Upon successful handling, a 'Completed' object may be created as follows:
```
{
  "Id": "177327211-IncidentAdd-Completed",
  "Timestamp": "2020-05-26 00:00:00"
}
```

The notification implementation module 122 may create a lock file to reserve the notification action. In this regard, the notification implementation module 122 may limit the number of handling attempts per notification object, where the number of retires in handling a notification object may be limited so as not to retry indefinitely.

The notification implementation module 122 may contact a contact registration lookup 804 to determine e-mail addresses from a stored security group guide, where the contact information identifier may be translated to actual contact information (email addresses for example), where an Active Directory is an implementation-specific technology for doing such.

The notification implementation module 122 may create and submit an email service 806 request from notification service specific metadata. Further, the notification implementation module 122 may create a "notification executed" lock file so that no further notification object handling will be executed with respect to an incident 106.

Figure 9:
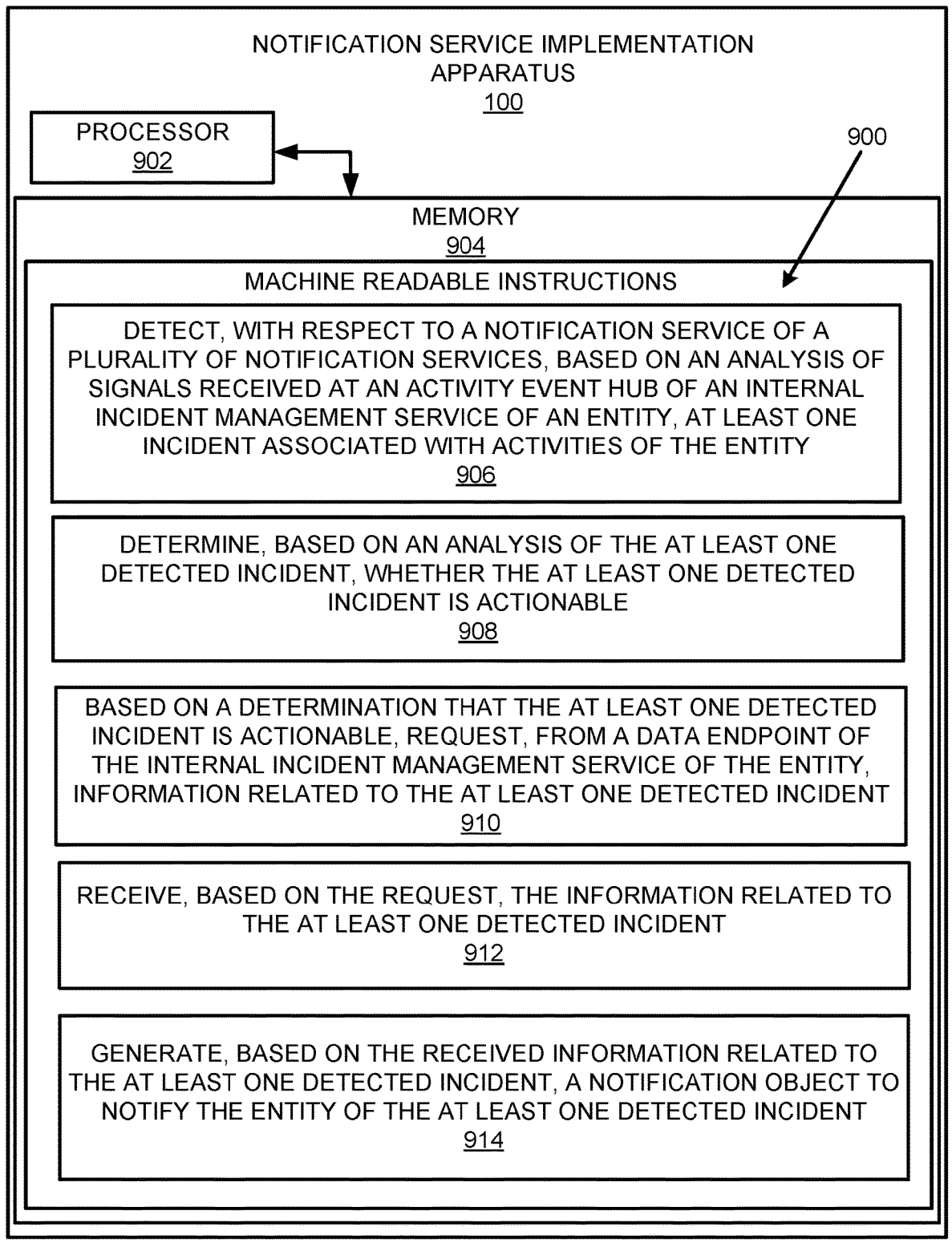
FIG. 9 illustrates an example block diagram for notification service implementation in accordance with an embodiment of the present disclosure.
Figure 9:
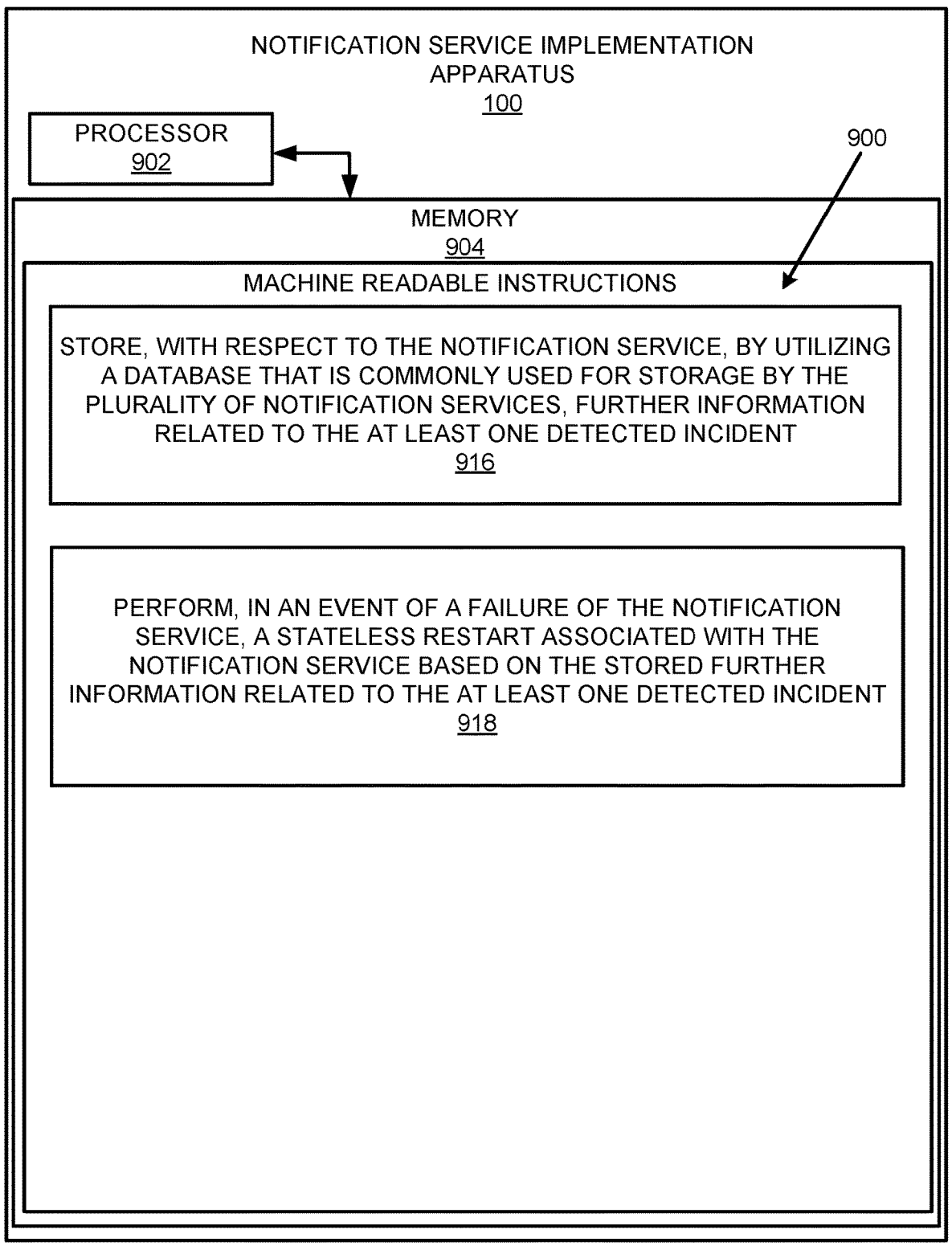
Figure 11:
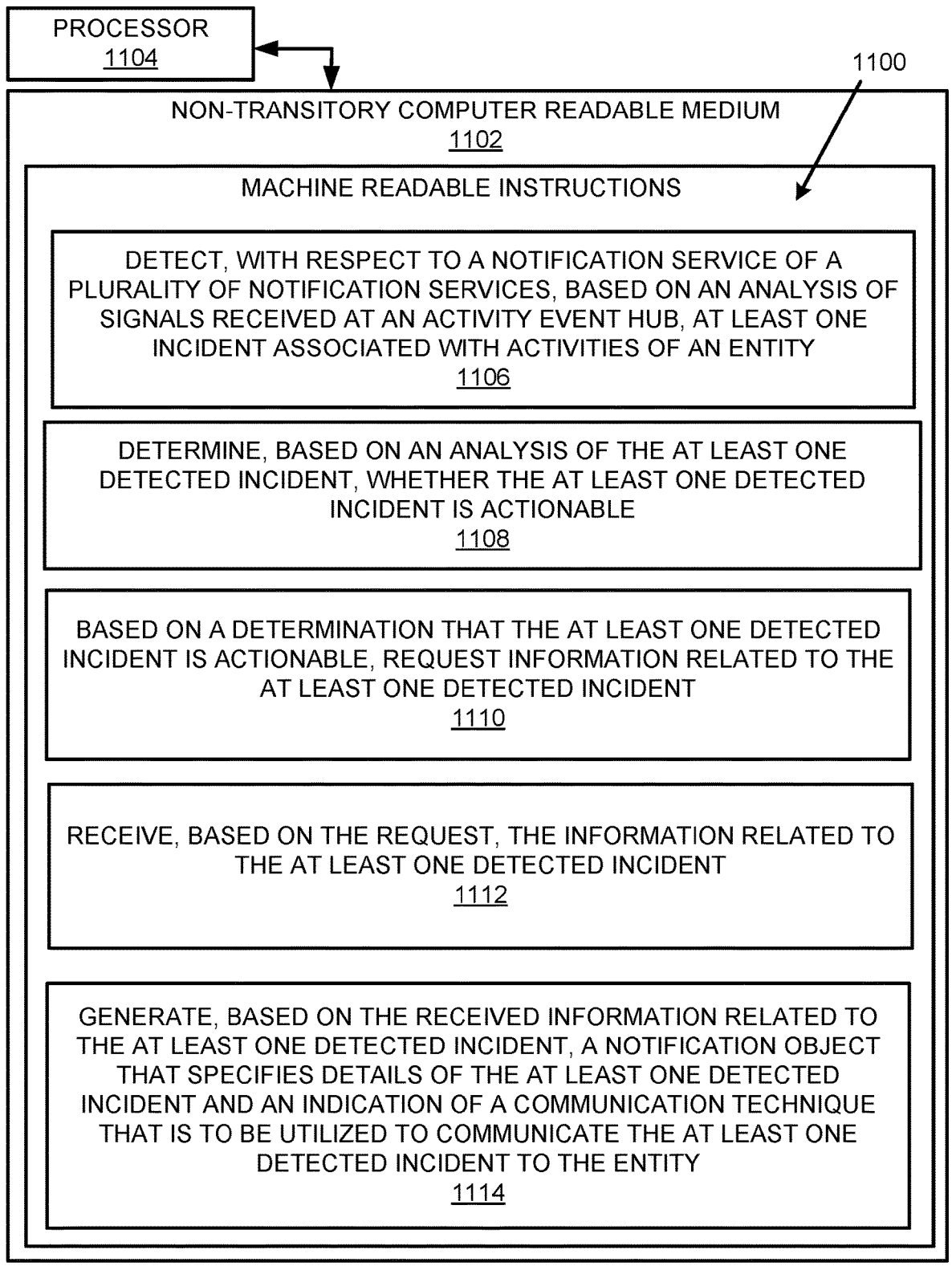
FIG. 11 illustrates a further example block diagram for notification service implementation in accordance with another embodiment of the present disclosure.
Figure 11:
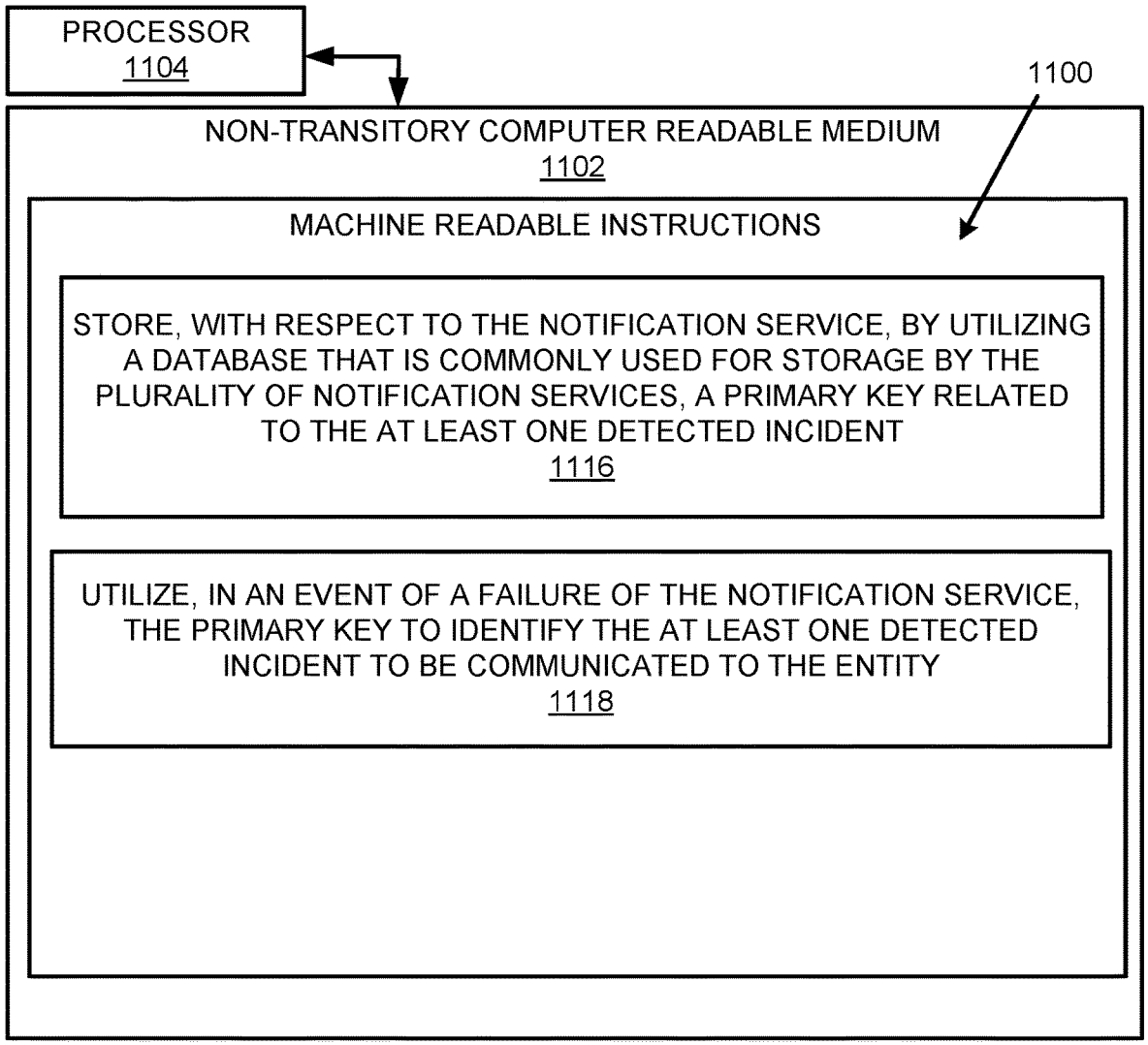

FIGS. 9-11 respectively illustrate an example block diagram 900, a flowchart of an example method 1000, and a further example block diagram 1100 for notification service implementation, according to examples. The block diagram 900, the method 1000, and the block diagram 1100 may be implemented on the apparatus 100 described above with reference to FIG. 1 by way of example and not of limitation. The block diagram 900, the method 1000, and the block diagram 1100 may be practiced in other apparatus. In addition to showing the block diagram 900, FIG. 9 shows hardware of the apparatus 100 that may execute the instructions of the block diagram 900. The hardware may include a processor 902, and a memory 904 storing machine readable instructions that when executed by the processor cause the processor to perform the instructions of the block diagram 900. The memory 904 may represent a non-transitory computer readable medium. FIG. 10 may represent an example method for notification service implementation, and the steps of the method. FIG. 11 may represent a non-transitory computer readable medium 1102 having stored thereon machine readable instructions to provide notification service implementation according to an example. The machine readable instructions, when executed, cause a processor 1104 to perform the instructions of the block diagram 1100 also shown in FIG. 11.

The processor 902 of FIG. 9 and/or the processor 1104 of FIG. 11 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1102 of FIG. 11), such as hardware storage devices (e.g., RAM (random access memory), ROM (read only memory), EPROM (erasable, programmable ROM), EEPROM (electrically erasable, programmable ROM), hard drives, and flash memory). The memory 904 may include a RAM, where the machine readable instructions and data for a processor may reside during runtime.

Referring to FIGS. 1-9, and particularly to the block diagram 900 shown in FIG. 9, the memory 904 may include instructions 906 to detect, with respect to a notification service 124 of a plurality of notification services 126, based on an analysis of signals received at an activity event hub 104 of an internal incident management service 130 of an entity 108, at least one incident 106 associated with activities of the entity 108.

The processor 902 may fetch, decode, and execute the instructions 908 to determine, based on an analysis of the at least one detected incident 106, whether the at least one detected incident 106 is actionable.

Based on a determination that the at least one detected incident 106 is actionable, the processor 902 may fetch, decode, and execute the instructions 910 to request, from a data endpoint 112 of the internal incident management service 130 of the entity 108, information 114 related to the at least one detected incident 106.

The processor 902 may fetch, decode, and execute the instructions 912 to receive, based on the request, the information 114 related to the at least one detected incident 106.

The processor 902 may fetch, decode, and execute the instructions 914 to generate, based on the received information 114 related to the at least one detected incident 106, a notification object 118 to notify the entity 108 of the at least one detected incident 106.

The processor 902 may fetch, decode, and execute the instructions 916 to store, with respect to the notification service 124, by utilizing a database 128 that is commonly used for storage by the plurality of notification services 126, further information related to the at least one detected incident 106.

The processor 902 may fetch, decode, and execute the instructions 918 to perform, in an event of a failure of the notification service 124, a stateless restart associated with the notification service 124 based on the stored further information related to the at least one detected incident 106.

Referring to FIGS. 1-8 and 10, and particularly FIG. 10, for the method 1000, at block 1002, the method may include detecting, by at least one processor, with respect to a notification service 124 of a plurality of notification services 126 that are each geographically located at different geographic locations, based on an analysis of signals received at an activity event hub 104 associated with the notification service 124, at least one incident 106 associated with activities of an entity 108.

At block 1004, the method may include determining, by the at least one processor, based on an analysis of the at least one detected incident 106, whether the at least one detected incident 106 is actionable.

Based on a determination that the at least one detected incident 106 is actionable, at block 1006, the method may include requesting, by the at least one processor, information 114 related to the at least one detected incident 106.

At block 1008, the method may include receiving, by the at least one processor, based on the request, the information 114 related to the at least one detected incident 106.

At block 1010, the method may include generating, by the at least one processor, based on the received information 114 related to the at least one detected incident 106, a notification object 118 to notify the entity 108 of the at least one detected incident 106.

Referring to FIGS. 1-8 and 11, and particularly FIG. 11, for the block diagram 1100, the non-transitory computer readable medium 1102 may include instructions 1106 to detect, with respect to a notification service 124 of a plurality of notification services 126, based on an analysis of signals received at an activity event hub 104, at least one incident 106 associated with activities of an entity 108.

The processor 1104 may fetch, decode, and execute the instructions 1108 to determine, based on an analysis of the at least one detected incident 106, whether the at least one detected incident 106 is actionable.

Based on a determination that the at least one detected incident 106 is actionable, the processor 1104 may fetch, decode, and execute the instructions 1110 to request information related to the at least one detected incident 106.

The processor 1104 may fetch, decode, and execute the instructions 1112 to receive, based on the request, the information 114 related to the at least one detected incident 106.

The processor 1104 may fetch, decode, and execute the instructions 1114 to generate, based on the received information 114 related to the at least one detected incident 106, a notification object 118 that specifies details of the at least one detected incident 106 and an indication of a communication technique 120 that is to be utilized to communicate the at least one detected incident 106 to the entity 108.

The processor 1104 may fetch, decode, and execute the instructions 1116 to store, with respect to the notification service 124, by utilizing a database 128 that is commonly used for storage by the plurality of notification services 126, a primary key related to the at least one detected incident 106.

The processor 1104 may fetch, decode, and execute the instructions 1118 to utilize, in an event of a failure of the notification service 124, the primary key to identify the at least one detected incident 106 to be communicated to the entity 108.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A computer-implemented method comprising:
   detecting, by at least one processor of a notification service of a plurality of notification services that are each geographically located at different geographic locations, based on an analysis of signals received at an activity event hub associated with the notification service, at least one incident associated with activities of an entity, wherein each of the plurality of notification services are located in different geographically distributed clusters in a cloud to notify the entity of the at least one detected incident;
   receiving, by the at least one processor of the notification service of the plurality of notification services, information related to the at least one detected incident from a data endpoint of an internal incident management service of the entity;
   generating, by the at least one processor of the notification service of the plurality of notification services, based on the received information related to the at least one detected incident, a notification object to notify the entity of the at least one detected incident, the notification object being correlated with a unique identifier related to the at least one detected incident;
   determining, by the at least one processor of the notification service of the plurality of notification services, based on the unique identifier related to the at least one detected incident, that the notification object to notify the entity of the at least one detected incident is a unique notification object, which is not a duplicate notification object generated by another notification service of the plurality of notification services; and
   performing, by the at least one processor of the notification service of the plurality of notification services, in an event of a failure of the notification service, a stateless restart of the notification service, wherein the stateless restart of the notification service does not require inter-service communication with the plurality of notification services.

2. The computer-implemented method according to claim 1, wherein detecting, by the at least one processor of the notification service of the plurality of notification services that are each geographically located at different geographic locations in the geographically distributed clusters in the cloud, based on the analysis of signals received at the activity event hub associated with the notification service, the at least one incident associated with the activities of the entity further comprises:
   detecting, by the at least one processor of the notification service of the plurality of notification services, with respect to the notification service of the plurality of notification services that are each geographically located at different geographic locations, based on the analysis of signals received at the activity event hub associated with the notification service, the at least one incident from a set of incident states that include an add incident state, an edit incident state, and a mitigate incident state associated with the activities of the entity.

3. The computer-implemented method according to claim 1, wherein detecting, by the at least one processor of the notification service of the plurality of notification services that are each geographically located at different geographic locations in the geographically distributed clusters in the cloud, based on the analysis of signals received at the activity event hub associated with the notification service, the at least one incident associated with the activities of the entity further comprises:
   detecting, by the at least one processor of the notification service of the plurality of notification services, with respect to the notification service of the plurality of notification services that include at least three notification services, based on the analysis of signals received at the activity event hub associated with the notification service, the at least one incident associated with the activities of the entity.

4. The computer-implemented method according to claim 1, further comprising:
   storing, with respect to the notification service of the plurality of notification services, by utilizing a database that includes a geo-distributed not only structured query language (NoSQL) database that is commonly used for storage by the plurality of notification services, the unique identifier related to the at least one detected incident, wherein the plurality of notification services are redundant notification services, wherein the notification object and the unique identifier are to be used by another notification service among the plurality of notification services to notify the entity of the at least one detected incident in an event of a failure of the notification service.

5. The computer-implemented method according to claim 1, further comprising:
   notifying, by the notification service of the plurality of notification services, the entity of the at least one detected incident without communication with another one of the plurality of notification services.

6. An apparatus comprising:
   a processor; and
   a computer readable medium on which is stored machine readable instructions that cause the processor to:
   detect, by a notification service of a plurality of notification services that are each geographically located at different geographic locations, based on an analysis of signals received at an activity event hub of an internal incident management service of an entity, at least one incident associated with activities of the entity, wherein each of the plurality of notification services are located in different geographically distributed clusters in a cloud to notify the entity of the at least one detected incident;
receive, by the notification service, information related to the at least one detected incident;
generate, by the notification service, based on the received information related to the at least one detected incident, a notification object to notify the entity of the at least one detected incident;
determine, by the notification service, based on a unique identifier related to the at least one detected incident, by utilizing a database that is commonly used for storage by the plurality of notification services, whether the notification object to notify the entity of the at least one detected incident is a unique notification object, which is not a duplicate notification object generated by another notification service of the plurality of notification services;
based on a determination that the notification object is the unique notification object, store, with respect to the notification service, by utilizing the database, the unique identifier related to the at least one detected incident; and
perform, in an event of a failure of the notification service, a stateless restart of the notification service, wherein the stateless restart of the notification service does not require inter-service communication with the plurality of notification services.

7. The apparatus according to claim 6, wherein the instructions to detect by the notification service of the plurality of notification services, based on the analysis of signals received at the activity event hub of the internal incident management service of the entity, the at least one incident associated with the activities of the entity further cause the processor to:
detect, with respect to the notification service of the plurality of notification services, based on the analysis of signals received at the activity event hub of the internal incident management service of the entity, the at least one incident from a set of incident states that include an add incident state, an edit incident state, and a mitigate incident state associated with the activities of the entity.

8. The apparatus according to claim 6, wherein the instructions further cause the processor to:
determine, based on an analysis of the at least one detected incident, whether the at least one detected incident is actionable by analyzing an event type associated with the at least one detected incident.

9. The apparatus according to claim 6, wherein the instructions further cause the processor to:
request, from a data endpoint, the information related to the at least one detected incident that includes an indication of whether an action is to be performed with respect to the at least one detected incident.

10. The apparatus according to claim 6, wherein the instructions to generate, based on the received information related to the at least one detected incident, the notification object to notify the entity of the at least one detected incident further cause the processor to:
generate, based on the received information related to the at least one detected incident, the notification object that specifies details of the at least one detected incident and an indication of a communication technique that is to be utilized to communicate the at least one detected incident to the entity.

11. The apparatus according to claim 10, wherein the instructions to generate, based on the received information related to the at least one detected incident, the notification object that specifies details of the at least one detected incident and the indication of the communication technique that is to be utilized to communicate the at least one detected incident to the entity further cause the processor to:
specify the communication technique that includes at least one of an e-mail, an internal notification service notification, or a short message service (SMS), to communicate the details of the at least one detected incident to the entity; and
perform the communication technique to communicate the at least one detected incident to the entity.

12. The apparatus according to claim 6, wherein the instructions to store, with respect to the notification service, by utilizing the database that is commonly used for storage by the plurality of notification services, the unique identifier related to the at least one detected incident further cause the processor to:
store, with respect to the notification service, by utilizing a geo-distributed NoSQL database that is commonly used for storage by the plurality of notification services, the unique identifier that includes a primary key associated with the at least one detected incident.

13. The apparatus according to claim 6, wherein the instructions to detect by the notification service of the plurality of notification services that are each geographically located at different geographic locations, based on the analysis of signals received at the activity event hub of the internal incident management service of the entity, the at least one incident associated with the activities of the entity further cause the processor to:
detect, with respect to the notification service of the plurality of notification services that include at least three notification services, based on the analysis of signals received at the activity event hub of the internal incident management service of the entity, the at least one incident associated with the activities of the entity.

14. The apparatus according to claim 6, wherein the instructions to store, with respect to the notification service, by utilizing the database that is commonly used for storage by the plurality of notification services, the unique identifier related to the at least one detected incident further cause the processor to:
store, with respect to the notification service, by utilizing the database that includes a geo-distributed not only structured query language (NoSQL) database that is commonly used for storage by the plurality of notification services, the unique identifier related to the at least one detected incident, wherein the plurality of notification services are redundant notification services, wherein the notification object and the unique identifier are to be used by another notification service among the plurality of notification services to notify the entity of the at least one detected incident in an event of a failure of the notification service.

15. The apparatus according to claim 6, wherein the instructions further cause the processor to:
notify the entity of the at least one detected incident without communication with another one of the plurality of notification services.

16. A non-transitory computer readable medium on which is stored machine readable instructions that when executed by a processor, cause the processor to:
detect, by a notification service of a plurality of geo-redundant notification services that are each geographically located at different geographic locations, based on an analysis of signals received at an activity event hub, at least one incident associated with activities of an entity, wherein each of the plurality of geo-redundant notification services are located in different geographically distributed clusters in a cloud to notify the entity of the at least one detected incident;

receive, by the notification service, information related to the at least one detected incident;

generate, by the notification service, based on the received information related to the at least one detected incident, a notification object that specifies details of the at least one detected incident and an indication of a communication technique that is to be utilized to communicate the at least one detected incident to the entity;

determine, by the notification service, based on a primary key related to the at least one detected incident, whether the notification object to notify the entity of the at least one detected incident is a unique notification object, which is not a duplicate notification object generated by another notification service of the plurality of geo-redundant notification services;

based on a determination that the notification object is the unique notification object, store, with respect to the notification service, by utilizing a database that is commonly used for storage by the plurality of geo-redundant notification services, the primary key related to the at least one detected incident;

utilize, in an event of a failure of the notification service, the primary key to identify the at least one detected incident to be communicated to the entity; and perform, in an event of a failure of the notification service, a stateless restart of the notification service, wherein the stateless restart of the notification service does not require inter-service communication with the plurality of geo-redundant notification services.

17. The non-transitory computer readable medium according to claim 16, wherein the instructions further cause the processor to:

request, from a data endpoint, the information related to the at least one detected incident that includes an indication of whether an action is to be performed with respect to the at least one detected incident.

18. The non-transitory computer readable medium according to claim 16, wherein the instructions to detect, with respect to the notification service of the plurality of geo-redundant notification services, based on the analysis of signals received at the activity event hub, the at least one incident associated with the activities of the entity further cause the processor to:

detect, with respect to the notification service of the plurality of geo-redundant notification services, based on the analysis of signals received at the activity event hub, the at least one incident from a set of incident states that include an add incident state, an edit incident state, and a mitigate incident state associated with the activities of the entity.

19. The non-transitory computer readable medium according to claim 16, wherein the instructions to store, with respect to the notification service, by utilizing the database that is commonly used for storage by the plurality of geo-redundant notification services, the primary key related to the at least one detected incident further cause the processor to:

store, with respect to the notification service, by utilizing the database that includes a geo-distributed not only structured query language (NoSQL) database that is commonly used for storage by the plurality of geo-redundant notification services, the primary key related to the at least one detected incident, wherein the plurality of geo-redundant notification services are redundant notification services, wherein the notification object and the primary key are to be used by another notification service of the plurality of geo-redundant notification services to notify the entity of the at least one detected incident in an event of a failure of the notification service.

20. The non-transitory computer readable medium according to claim 16, wherein the instructions further cause the processor to:

notify, by the notification service of the plurality of geo-redundant notification services, the entity of the at least one detected incident without communication with another one of the plurality of geo-redundant notification services.

* * * * *